United States Patent

Krauthamer et al.

(10) Patent No.: US 12,293,121 B2
(45) Date of Patent: May 6, 2025

(54) SYSTEMS AND METHODS FOR ADJUSTING AN IMAGE DISPLAYED VIA A FOOD AND/OR DRINK CONTAINER

(71) Applicant: Universal City Studios LLC, Universal City, CA (US)

(72) Inventors: Akiva Meir Krauthamer, Ocoee, FL (US); Aaron Chandler Jeromin, Winter Garden, FL (US); Kimberly Anne Humphreys, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 334 days.

(21) Appl. No.: 17/853,135

(22) Filed: Jun. 29, 2022

(65) Prior Publication Data

US 2023/0350623 A1 Nov. 2, 2023

Related U.S. Application Data

(60) Provisional application No. 63/337,373, filed on May 2, 2022.

(51) Int. Cl.
*G06F 3/14* (2006.01)
*B65D 25/20* (2006.01)
*G09F 9/30* (2006.01)
*G09F 23/06* (2006.01)
*G09G 3/34* (2006.01)

(52) U.S. Cl.
CPC .............. *G06F 3/14* (2013.01); *B65D 25/20* (2013.01); *G09F 9/30* (2013.01); *G09F 23/06* (2013.01); *G09G 3/344* (2013.01)

(58) Field of Classification Search
CPC ... G06F 3/14; B65D 25/20; G09F 9/30; G09F 23/06
See application file for complete search history.

(56) References Cited

U.S. PATENT DOCUMENTS

| 4,541,072 | A | * | 9/1985 | Kikuchi | G09G 3/3486 365/29 |
| 5,655,965 | A | * | 8/1997 | Takemoto | G07F 17/3211 463/31 |
| 6,173,209 | B1 | * | 1/2001 | Laval | G06Q 10/04 235/382 |
| 8,550,288 | B2 | | 10/2013 | Briar et al. | |
| 8,672,504 | B2 | * | 3/2014 | Kramer | A47G 23/0306 340/568.1 |
| 9,010,953 | B1 | | 4/2015 | Wells | |

(Continued)

OTHER PUBLICATIONS

"Lycurgus Cup," Wikipedia, Wikimedia Foundation, Apr. 20, 2022, 9 pages, https://en.wikipedia.org/wiki/Lycurgus_Cup.

(Continued)

*Primary Examiner* — David Bilodeau
(74) *Attorney, Agent, or Firm* — Fletcher Yoder, P.C.

(57) ABSTRACT

A food and/or drink container includes an enclosure forming a space configured to receive a food and/or drink, a display coupled to the enclosure, and a processor communicatively coupled to the display. The processor is configured to receive an indication of a current location of the food and/or drink container and cause the display to output imagery based on the current location.

20 Claims, 10 Drawing Sheets

(56) References Cited

U.S. PATENT DOCUMENTS

| | | | | |
|---|---|---|---|---|
| 9,488,903 | B1* | 11/2016 | Veras de Souza | G03B 25/00 |
| 9,628,434 | B2* | 4/2017 | Laidlaw | G10L 15/22 |
| 11,013,353 | B2 | 5/2021 | Hambrock et al. | |
| 2003/0048417 | A1* | 3/2003 | Rudnick | G03B 25/00 |
| | | | | 352/101 |
| 2005/0205437 | A1* | 9/2005 | Huffman | B65D 25/20 |
| | | | | 206/217 |
| 2009/0026273 | A1* | 1/2009 | Gelbman | G06F 3/147 |
| | | | | 235/492 |
| 2011/0239502 | A1* | 10/2011 | Gladman | G09F 3/16 |
| | | | | 215/386 |
| 2012/0005130 | A1* | 1/2012 | Gebhard | G09F 23/06 |
| | | | | 705/500 |
| 2015/0366383 | A1 | 12/2015 | Raunio et al. | |
| 2016/0210585 | A1* | 7/2016 | Spiro | G06F 3/14 |
| 2017/0273488 | A1 | 9/2017 | Lonis | |
| 2017/0361225 | A1* | 12/2017 | Goslin | A63F 13/28 |
| 2019/0208938 | A1 | 7/2019 | Lee et al. | |
| 2019/0235819 | A1* | 8/2019 | Bielawski | A47G 19/2227 |
| 2020/0135076 | A1* | 4/2020 | Sadornil | A61B 5/0205 |
| 2020/0234615 | A1* | 7/2020 | Shardlow | G09F 7/20 |
| 2022/0082542 | A1 | 3/2022 | Lachwani et al. | |
| 2022/0253210 | A1* | 8/2022 | Onoda | G06F 1/3209 |

OTHER PUBLICATIONS

Wolff-Mann, Ethan, "This Mug Has a Heat-Powered E-Ink Screen," Thrillist, Apr. 24, 2014, 2 pages, https://www.thrillist.com/gear/the-muki-coffee-mug-that-has-a-heat-powered-e-ink-screen.
PCT/US2023/020604 Invitation to Pay Additional Fees mailed Aug. 2, 2023.
PCT/US2023/020604 International Search Report and Written Opinion mailed Sep. 25, 2023.
Aric Caley, "Display Cup," Apr. 8, 2019, pp. 1-3, YouTube, https://www.youtube.com/watch?v=yJuSbYkX_Y4&t=5s.

* cited by examiner

SYSTEMS AND METHODS FOR ADJUSTING AN IMAGE DISPLAYED VIA A FOOD AND/OR DRINK CONTAINER

CROSS-REFERENCE TO RELATED APPLICATION

This application claims priority to and the benefit of U.S. Provisional Application No. 63/337,373, entitled "SYSTEMS AND METHODS FOR ADJUSTING AN IMAGE DISPLAYED VIA A FOOD AND/OR DRINK CONTAINER," filed May 2, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park or other entertainment venue may include a variety of features to entertain guests or patrons. As an example, the amusement park may have various attractions, which may include a ride, a performance, a decoration or prop, and so forth. Guests may also be entertained by purchasing or otherwise acquiring various items or objects (e.g., souvenirs) from the amusement park as a gift, memento, award, or the like. With the increasing sophistication and complexity of amusement park features, and the corresponding increase in expectations among amusement park guests, improved and more creative ways of entertaining the guests are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a food and/or drink container includes an enclosure forming a space configured to receive a food and/or drink, a display coupled to the enclosure, and a processor communicatively coupled to the display. The processor is configured to receive an indication of a current location of the food and/or drink container and cause the display to output imagery based on the current location.

In an embodiment, a refreshments container includes an enclosure defining an interior configured to receive refreshments, a display coupled to the enclosure, and a control system communicatively coupled to the display. The control system is configured to cause the display to present imagery based on a first location of the refreshments container and cause the display to adjust the imagery being presented based on a second location of the refreshments container. The device is configured to maintain presentation of the imagery without utilizing power.

In an embodiment, a system includes a food and/or beverage container that has an enclosure defining a space for retaining a food or a beverage and a display coupled to the enclosure and configured to present imagery. The system also includes a device separate from the food and/or beverage container. The device is configured to engage with the food and/or beverage container, and the display is configured to adjust the imagery being presented in response to an engagement between the device and the food and/or beverage container.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
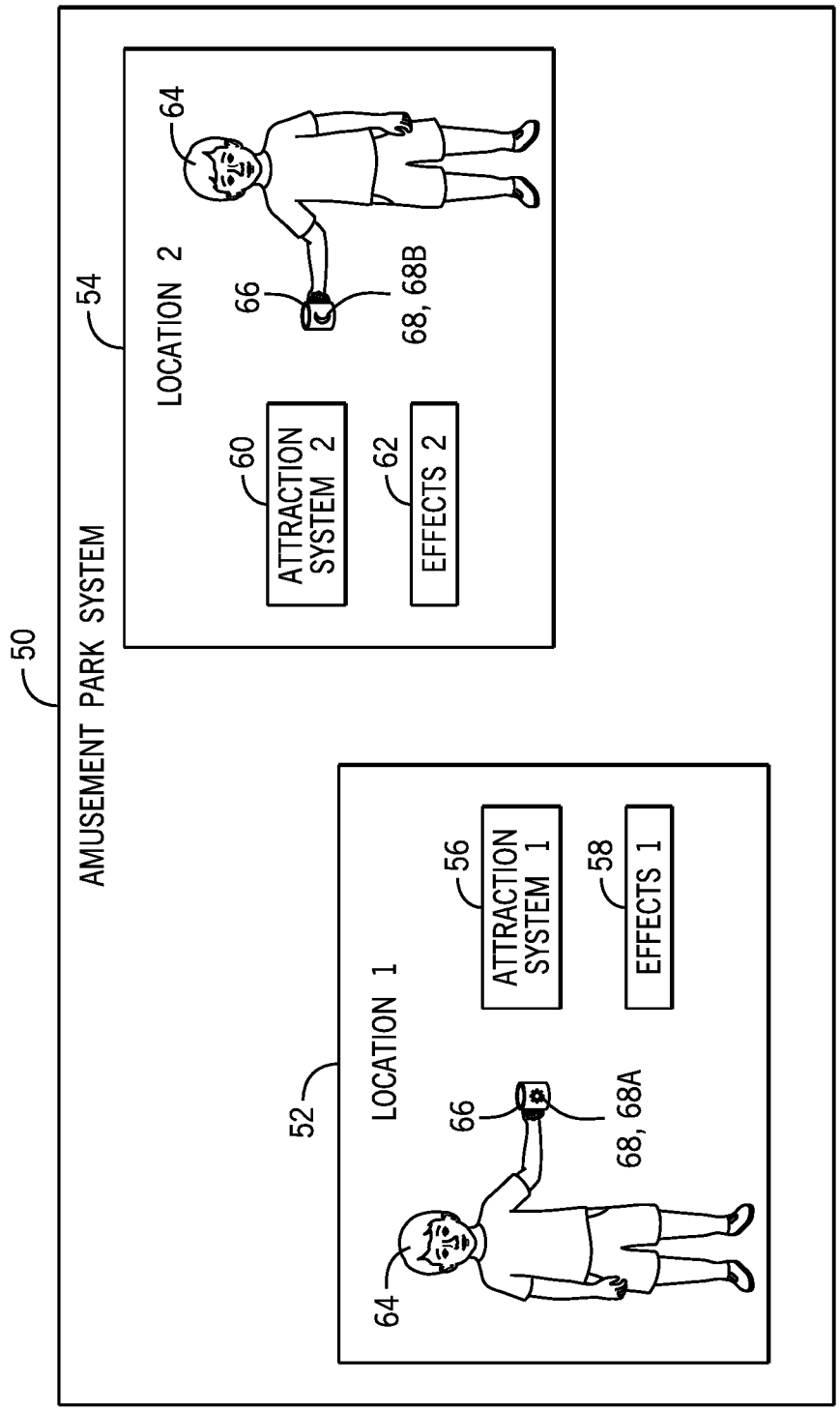
FIG. 1 is a schematic diagram of an embodiment of an amusement park system having a food and/or drink container configured to present different imagery, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally related to an amusement or theme park. The amusement park may include a variety of features, such as rides (e.g., a roller coaster), theatrical shows, performers, and/or show set props. Such features may provide entertainment to guests of the amusement park. For example, different effects (e.g., show effects) may be presented to provide an immersive experience to the guests. The guests may also obtain certain items or objects while at the amusement park. As an example, a guest may purchase an item, win an item, or otherwise receive an item during their amusement park experience. The guest may carry the item to different locations of the amusement park. For instance, the item may include a food and/or drink container that can be held by the guest, such as to store and contain a snack, a liquid, victuals, refreshments, or any other suitable sustenance or nourishment. Thus, the guest may use the item to enjoy different food and/or drinks at different areas of the amusement park.

It may be desirable to enable the food and/or drink container to provide an effect that further enhances the amusement park experience of the guests. For example, the food and/or drink container may be configured to present content, such as imagery. The food and/or drink container may also be configured to adjust the content being presented to provide a desirable effect or experience for a guest. The content may correspond to other effects provided to the guest at a certain location within the amusement park, thereby providing an immersive and/or interactive experience that supplements the experience provided by other features, such as attractions, of the amusement park.

In an embodiment, the food and/or drink container may provide imagery at different locations of the food and/or drink container. For instance, the food and/or drink container may include a control system configured to determine a location of the food and/or drink container, select imagery based on the location, and cause a display of the food and/or drink container to present the imagery. The display may be configured to maintain presentation of the imagery without consuming power or by consuming a low amount of power. As an example, the display may be configured to use an electronic paper or electronic ink technique to present imagery. As another example, the display may contain magnetic particles, and a positioning of the magnetic particles may be adjusted to present imagery. Furthermore, in an embodiment, the food and/or drink container may provide imagery in response to an interaction between the food and/or drink container and an interactive element, such as a detectable or otherwise interactive prop, of the amusement park. For example, the control system may receive data indicative of the interaction and cause the display of the food and/or drink container to adjust imagery being presented based on the data. Additionally, or alternatively, the interactive element may engage (e.g., physically or electronically) with the food and/or drink container, and the engagement between the food and/or drink container may cause the display to adjust imagery being presented. In any case, the imagery being presented by the display may be adjusted in accordance with a location of the food and/or drink container, and therefore in accordance with a location of a guest in possession of the food and/or drink container, to provide a desirable effect, such as any visual, audio, tactile, or other effect to entertain the guest. Although the present disclosure primarily relates to a food and/or drink container, the techniques described herein may be incorporated in any suitable item, such as a hat, a bag, a shirt, and so forth, that a guest may carry to various locations of an amusement park, and the item may be configured to adjust imagery being presented at different locations.

With the preceding in mind, FIG. 1 is a schematic diagram of an amusement park system 50. The amusement park system 50 may include different locations or areas, such as a first location 52 (e.g., a first area location, a first geographic location) and a second location 54 (e.g., a second area location, a second geographic location). Each of the first and second locations 54 may include a geographic space defined by an area or volume. The first location 52 may include a first attraction system 56 and first effects 58 (e.g., first entertainment effects, first show effects, first visual effects, first audio effects, first tactile effects), and the second location 54 may include a second attraction system 60 and second effects 62 (e.g., second entertainment effects, second show effects, second visual effects, second audio effects, second tactile effects). The first and second attraction systems 56, 60 may include a ride (e.g., a roller coaster) and/or a performance show, and the first and second effects 58, 62 may include a prop (e.g., an animated figure), an audio effect, a visual effect, and so forth. The first and second attraction systems 56, 60 and first and second effects 58, 62 may cooperatively entertain guests at the different first and second locations 52, 54 of the amusement park system 50.

A guest 64 may navigate through the amusement park system 50, such as between the first location 52 and the second location 54. The guest 64 may carry a food and/or drink container 66 (e.g., a food and/or beverage container, a refreshments container, a nourishment container, a sustenance container, a victuals container, a consumables container) while navigating the amusement park system 50. The food and/or drink container 66 may include a cup, a bottle, a mug, a jug, a pitcher, a goblet, a bowl, a plate, a dish, a tub, a bucket, and so forth configured to store, hold, receive, or otherwise contain various sustenance, nourishments, or refreshments. For example, the food and/or drink container 66 may be configured to contain a snack (e.g., popcorn), a meal (e.g., a sandwich), or any other suitable victuals (e.g., solid food). The food and/or drink container 66 may additionally, or alternatively, be configured to contain a beverage or any suitable liquid nutriment. Indeed, the food and/or drink container 66 may store any suitable consumable that may be used by the guest 64. The food and/or drink container 66 may also be portable (e.g., of a limited size and/or weight) to facilitate usage by the guest 64. As an example, the guest 64 may bring the food and/or drink container 66 to the different first and second locations 52, 54 and utilize the food and/or drink container 66 to store respective foods and/or drinks that may be specific to the first and second locations 52, 54 and therefore enjoy different sustenance throughout the amusement park system 50.

The food and/or drink container 66 may be configured to present imagery 68 or other content (e.g., an audio effect) that is observable to the guest 64. The food and/or drink container 66 may also be configured to adjust the imagery 68 being presented. For example, the food and/or drink container 66 may be configured to present first imagery 68A at the first location 52 and second imagery 68B, different from the first imagery 68A, at the second location 54. The adjustment of the imagery 68 being presented may enhance the experience provided to the guest 64 by the amusement park system 50, such as by further immersing the guest 64 in the environment emulated by the amusement park system 50 and/or by causing the guest 64 to perceive an interaction between the food and/or drink container 66 and a surrounding environment.

By way of example, in an embodiment, the different first and second locations 52, 54 may have a different theme, such as a different environment or atmosphere presented via the respective first and second attraction systems 56, 60 and/or the first and second effects 58, 62. The imagery 68 presented by the food and/or drink container 66 may correspond to the theme of the particular location 52, 54 of the guest 64 and the food and/or drink container 66. For instance, the theme of the first location 52 may be associated with a daytime or diurnal theme, and the first imagery 68A (e.g., a sun) presented by the food and/or drink container 66 at the first location 52 may therefore be day related. The theme of the second location 54 may be associated with a nighttime or nocturnal theme, and the second imagery 68B (e.g., a moon) presented by the food and/or drink container 66 at the second location 54 may therefore be night related. In this manner, the imagery 68 presented by the food and/or drink container 66 may be more closely related to the location 52, 54 of the food and/or drink container 66 to provide a more immersive or interactive experience to the guest 64.

Figure 2:
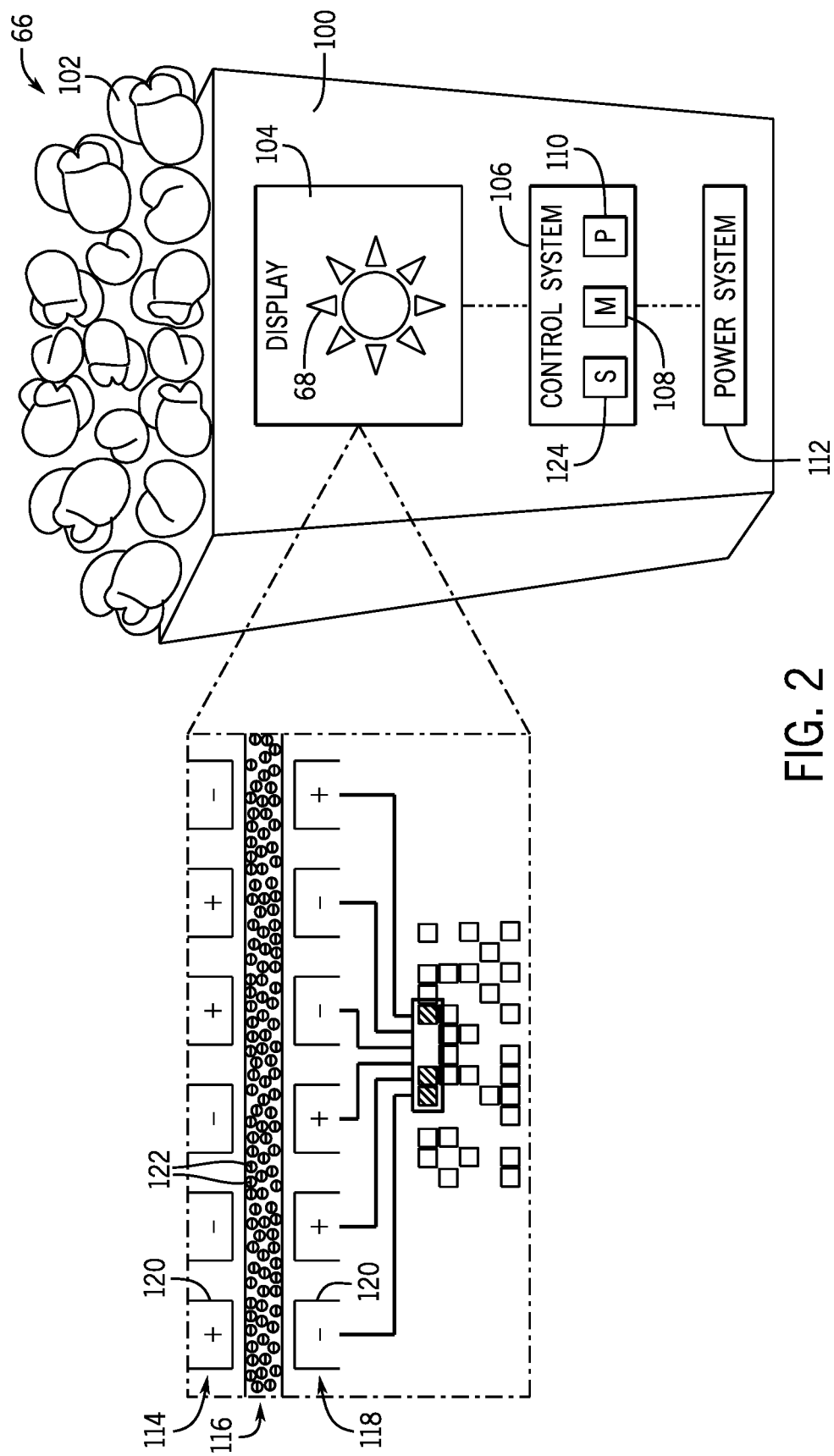
FIG. 2 is a front perspective view of an embodiment of a food and/or drink container configured to adjust imagery being presented, in accordance with an aspect of the present disclosure.

FIG. 2 is a front perspective view of an embodiment of the food and/or drink container 66 (e.g., a food and/or drink container system) configured to adjust imagery being presented. The food and/or drink container 66 may include an enclosure 100 configured to receive sustenance 102 (e.g., a solid food, a liquid drink). For example, the enclosure 100 may define an interior or space in which the sustenance 102 may be received and contained. The food and/or drink container 66 may also include a display 104 configured to present the imagery 68 that may be visible at an exterior of the enclosure 100. As an example, the display 104 may be coupled to an exterior surface of the enclosure 100, such that the imagery 68 is presented externally to the enclosure 100. As another example, the display 104 may be coupled to an interior surface of the enclosure 100, such as against an interior wall, and the imagery 68 presented by the display 104 may be visible through the enclosure 100 (e.g., the enclosure may be at least partially transparent).

The food and/or drink container 66 may also include a control system or control circuitry 106 (e.g., an automation controller, a programmable controller, an electronic controller) configured to adjust the imagery 68 presented by the display 104. The control system 106 may include a memory 108 and processing circuitry 110. The memory 108 may include volatile memory, such as random access memory (RAM), and/or non-volatile memory, such as read-only memory (ROM), optical drives, hard disc drives, solid-state drives, or any other non-transitory computer-readable medium that includes instructions. The processing circuitry 110 may be configured to execute such instructions. For example, the processing circuitry 110 may include one or more application specific integrated circuits (ASICs), one or more field programmable gate arrays (FPGAs), one or more general purpose processors, or any combination thereof. The control system 106 may be communicatively coupled to the display 104 and configured to operate the display 104. For example, the control system 106 may be configured to instruct the display 104 to present the imagery 68 and/or to adjust the imagery 68 being presented. To this end, the control system 106 may be electrically coupled to a power source 112 (e.g., a battery or solar cells), which may be configured to provide power to the control system 106.

In an embodiment, each of the power source 112 and the control system 106 may be integral with a remainder of the food and/or drink container 66. For instance, the control system 106 and/or the power source 112 may be contained within the enclosure 100 (e.g., a compartment of the enclosure 100 separate from the space in which the sustenance 102 is received), which may shield the control system 106 and/or the power source 112 from other environmental factors (e.g., dust, debris, the sustenance 102) that may affect operation of the control system 106 and/or of the power source 112. In such an embodiment, the power source 112 may include a power storage (e.g., a battery, a capacitor) configured to provide stored power to the control system 106 and/or a power harvesting device (e.g., a solar cell, a light collecting cell, a hand-crank generator, a thermoelectric generator) configured to harvest energy (e.g., solar energy, light energy, kinetic energy, thermal differential energy) from the surrounding environment to generate power and provide the generated power to the control system 106. Thus, the power source 112 may be configured to provide power to the control system 106 without having to connect the control system 106 to an additional power source (e.g., an exterior power source) that may not be integral to or a part of the food and/or drink container 66. In this manner, the food and/or drink container 66 may be self-powered and facilitate portability. However, in an additional or alternative embodiment, the control system 106 and/or the power source 112 may be external to the enclosure 100. For example, the power source 112 may include an external power source (e.g., grid power, a power storage or generator) that is not integral to the food and/or drink container 66, and the food and/or drink container 66 (e.g., the display 104, the control system 106) may be configured to couple to the power source 112 to receive power for operating the display 104. In such an embodiment, the food and/or drink container 66 may also be configured to decouple from the power source 112 to enable the guest to carry the food and/or drink container 66 to different locations. In any case, the control system 106 may utilize the power received from the power source 112 to control the display 104 and control presentation of the imagery 68.

In one embodiment, the display 104 may include an electronic paper or electrophoretic display, which may utilize reflection of light instead of emission of light to display the imagery 68. For example, the display 104 may not utilize power and/or may utilize a low amount of power to maintain presentation of the imagery 68. Thus, presentation of the imagery 68 may be maintained in the absence of power (e.g., from the power source 112). In an embodiment, the display 104 may utilize electrophoretic features that include a first layer 114, a second layer 116, and a third layer 118. The first layer 114 and the third layer 118 may include corresponding electrodes 120 that align with one another at opposite sides of the second layer 116. The second layer 116 may include a vessel or chamber configured to enclose particles 122, such as titanium dioxide, that are electrically charged. The particles 122 may be submerged within a dark-colored fluid (e.g., oil with dark-colored dye) in the second layer. The control system 106 may control the charge of the electrodes 120 to implement a positive and/or a negative charge, and the implemented charge may drive movement of the particles 122 within the vessel of the second layer 116.

For example, a subset of the particles 122 (e.g., positively charged particles 122) may move toward the electrodes 120 having a first charge (e.g., a negative charge) and away from the electrodes 120 having a second charge (e.g., a positive charge) opposite the first charge. The positioning of the particles 122 may control a visibility or appearance of pixels visible to a guest. For instance, the first layer 114 may be transparent, and the particles 122 may reflect light emitted through the first layer 114 when positioned more adjacent to the first layer 114 than to the third layer 118. As such, in sections where the particles 122 are positioned more adjacent to the first layer 114 than to the third layer 118, the particles 122 may reflect light to cause the guest to see a white or otherwise colorless appearance. However, in sections where the particles 122 are positioned more adjacent to the third layer 118 than to the first layer 114, the dark-colored fluid may be positioned adjacent to the first layer 114 instead and may absorb light emitted through the first layer 114, thereby causing the guest to see a dark appearance. In this manner, the positioning of the particles 122 at various sections within the second layer 116 will provide an appearance of pixels (e.g., black and white pixels) arranged to present the imagery 68 to the guest.

In this described embodiment, the control system 106 may be configured to interface with the power source 112 to adjust the charge of the electrodes 120 via power received from the power source 112, thereby adjusting the positioning of the particles 122 within the second layer 116 (e.g., relative to the first layer 114 and to the third layer 118) and adjusting the imagery 68 presented by the display 104. However, the control system 106 may not have to interface with the power source 112 to maintain the charge of the electrodes 120 or otherwise maintain the positioning of the particles 122 within the second layer 116. As such, the imagery 68 presented via the positioning of the particles 122 within the second layer 116 may be maintained in the absence of the power received from the power source 112 and/or in the absence of operation of the control system 106. In other words, power may primarily be used to adjust the imagery 68, and limited or no power may be used to maintain presentation of the imagery 68. Indeed, the display 104 may maintain presentation of the imagery 68 for an indefinite period of time, such as when the food and/or drink container 66 is carried outside of the amusement park system. It should also be noted that the display 104 may use any other suitable electronic display features, such as a microencapsulated electrophoretic feature having particles of different colors, color filters to present colored image data, an electrowetting technique to control a shape of a water/oil interface via an applied voltage, or any combination thereof to maintain presentation of the imagery 68 while utilizing little or no power. In a further embodiment, the display 104 may include any other suitable display, such as a light emitting diode display and/or a liquid crystal display.

In one embodiment, the control system 106 may be configured to adjust the imagery 68 being presented based on a determined parameter. For example, the control system 106 may include or be communicatively coupled to a sensor 124 configured to determine the parameter. The sensor 124 may output data indicative of the parameter, and the control system 106 may operate the display 104 (e.g., the electrodes 120) based on the data. For instance, the control system 106 may determine the parameter, reference stored data (e.g., a database table) that associates respective imagery to the corresponding parameters or parameter values, select the imagery associated with the determined parameter based on the stored data, and cause the display 104 to present the selected imagery. As an example, the parameter may be indicative of a location (e.g., the first location 52, the second location 54 of FIG. 1) of the amusement park system. To this end, the sensor 124 (e.g., a global positioning system, an accelerometer, a gyroscope, an inertial measurement unit) may be configured to determine the location of the food and/or drink container 66, such as based on detected movement of the food and/or drink container 66. The control system 106 may be configured to control the display 104 based on the location indicated by the parameter.

Additionally, or alternatively, the sensor 124 may include a receiver configured to receive various signals (e.g., ultra high frequency waves, very high frequency waves, high frequency waves, Wi-Fi signals) transmitted throughout the amusement park system. The parameter determined by the sensor 124 may include a signal having a property (e.g., a frequency, an intensity, a wavelength). For example, the signals transmitted at different locations of the amusement park system may have different properties, and each signal may therefore correspond to a particular location based on associated properties of the signal. The control system 106 may determine the property of a signal received by the sensor 124 and control the display 104 based on the property. As such, the control system 106 may cause the display 104 to present particular imagery based on the location of the amusement park system and the corresponding property of the signal broadcasted at the location. The control system 106 may further be configured to cause the display 104 to adjust the imagery 68 being presented based on any other suitable parameter that may be determined by the sensor 124, such as a time of day (e.g., a different imagery may be presented during the morning as compared to during the afternoon), a day of the year, a temperature (e.g., of the ambient environment, of the food and/or drink within the enclosure 100), an amount of ambient lighting, a weather condition, an amount (e.g., a weight, a level, a volume) of the food and/or drink within the enclosure 100, a number of times the food and/or drink container 66 has been filled or re-filled, or any combination thereof.

By utilizing information received from the sensor 124, the control system 106 may automatically cause the display 104 to adjust the imagery 68 being presented (e.g., without a user input). Thus, adjustment of the imagery 68 via the food and/or drink container 66 may appear to be more immersive, mystical, or captivating to the guest. For example, the guest may perceive that the food and/or drink container 66 is actively operating based on the surrounding environment and/or based on properties of contents of the food and/or drink container 66.

Figure 3:
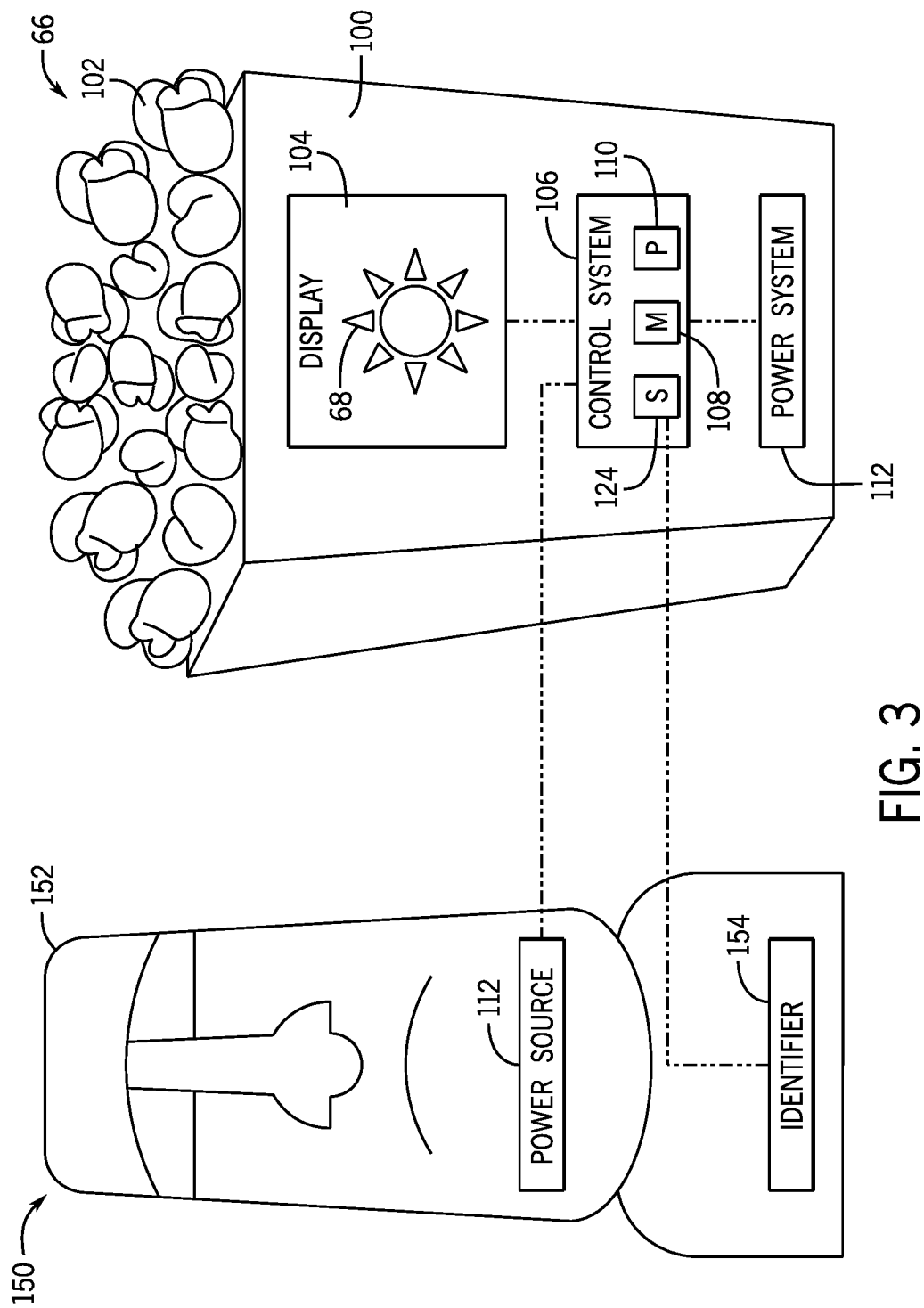
FIG. 3 is a schematic diagram of an embodiment of a system configured to adjust imagery presented via a food and/or drink container, in accordance with an aspect of the present disclosure.

FIG. 3 is schematic diagram of an embodiment of a system 150 configured to adjust the imagery 68 presented by the food and/or drink container 66. The system 150 may include an interactive element 152, such as an animated figure, a statue, a decoration, or any other suitable prop, of the amusement park system. The control system 106 may be configured to operate the display 104 to adjust the imagery 68 based on a determined interaction between the food and/or drink container 66 and the interactive element 152. For example, the amusement park system may include different interactive elements 152 at different locations. An interaction between the food and/or drink container 66 and any of the interactive elements 152 may cause the control system 106 to operate the display 104 to adjust the imagery 68, such as to present imagery 68 that corresponds to the particular interactive element 152 with which the food and/or drink container 66 interacted.

In an embodiment, the interactive element 152 may include a unique identifier 154, and the control system 106 may be configured to determine the identifier 154 of the interactive element 152 and cause the display 104 to present the imagery 68 based on the identifier 154. For example, the identifier 154 may include a barcode, a quick response code, a serial number, or any other suitable physical identifying characteristic, and the sensor 124 (e.g., a scanner, a reader) may include an optical sensor configured to scan, visually detect, or capture the identifier 154 as image data. The control system 106 may cause the display 104 to adjust the imagery 68 based on the image data. In an additional or alternative embodiment, the identifier 154 may include a signal transmitted by the interactive element 152. For example, the interactive element 152 may include a transmitter configured to output a signal indicative of the identifier 154 using radio frequency identification, near-field communication, or any other suitable technique, and the sensor 124 may include a reader configured to capture the signal output by the interactive element 152. The control system 106 may then cause the display 104 to adjust the imagery 68 based on the captured signal. In such embodiments, the interaction between the interactive element 152 and the food and/or drink container 66 may include placement of the food and/or drink container 66 within a threshold distance of the interactive element 152 (e.g., of the identifier 154) to enable the control system 106 to determine the identifier 154 and cause the display 104 to adjust the imagery 68 based on the identifier 154.

In an additional or alternative embodiment, the interactive element 152 may include the power source 112 (e.g., the food and/or drink container 66 may not include an integral power source 112). The power source 112 of the interactive element 152 may be configured to electrically couple to the control system 106. Upon electrically coupling to the power source 112, the control system 106 may interface with the power source 112 to cause the display 104 to adjust the imagery 68 via power provided by the power source 112. As an example, the interactive element 152 may include a conductor (e.g., a wire) configured to physically couple to the food and/or drink container 66, and the conductor may deliver electrical power from the power source 112 to the control system 106 upon physically coupling to the food and/or drink container 66. As another example, the power source 112 may be configured to utilize a wireless charging technique to provide power to the control system 106. The control system 106 may also be configured to disengage from the power source 112, and presentation of the imagery 68 may be maintained while the control system 106 is disengaged from the power source 112. However, because the control system 106 may not receive power while disengaged from the power source 112, the control system 106 may not adjust or change the imagery 68 being presented while the control system 106 is not electrically coupled to any power source 112. Upon electrically coupling to the power source 112 of another interactive element 152 (e.g., at a different location of the amusement park system), the control system 106 may receive power again and cause the display 104 to adjust the imagery 68 by interfacing with the power source 112. In this manner, each time the control system 106 is newly electrically coupled to a power source 112 of an interactive element 152 (e.g., each time the food and/or drink container 66 is newly placed in engagement with a power source 112), the control system 106 may cause the display 104 to update the imagery 68 being presented. As such, the control system 106 may be configured to cause the display 104 to adjust the imagery 68 in response to an interaction that includes an engagement between the food and/or drink container 66 and the power source 112.

In an embodiment, the control system 106 may be configured to cause the display 104 to present specific imagery 68 based on the interactive element 152 having the power source 112 from which power is received. For example, electrically coupling between the control system 106 and the power source 112 of the interactive element 152 may cause the interactive element 152 (e.g., the power source 112) to transmit data to the control system 106. The control system 106 may cause the display to adjust the imagery 68 based on the data. For instance, the data (e.g., an identifier of the interactive element 152, a geographic area in which the interactive element 152 is positioned) may be indicative of a location, and the control system 106 may determine the location based on the data and cause the display 104 to present the imagery 68 based on the location. Different interactive elements 152, each having a respective power source 112, may transmit different data. Therefore, electrically coupling the control system 106 to different interactive elements 152 may cause the control system 106 to receive different data and adjust the imagery 68 accordingly. In this manner, a guest may be motivated to bring the food and/or drink container 66 to different locations to electrically couple to different interactive elements 152 and adjust the imagery 68 being presented via the display 104.

In a further embodiment, the control system 106 may determine any other suitable interaction associated with the interactive element 152 to cause the display 104 to adjust the imagery 68. For example, the interactive element 152 may be configured to output a particular signal based on an interaction between a guest and the interactive element 152, such as a gesture provided by the guest, a user input (e.g., via a user interface associated with the interactive element 152), and so forth. The sensor 124 may be configured to determine the outputted signal, which indicates the interaction between the guest and the interactive element 152. The control system 106 may then cause the display 104 to adjust the imagery 68 based on the signal indicative of the interaction between the guest and the interactive element 152. In these examples, the food and/or drink container 66 may provide a more interactive experience for the guest, such as an appearance that the food and/or drink container 66 is interacting with the amusement park system.

Figure 4:
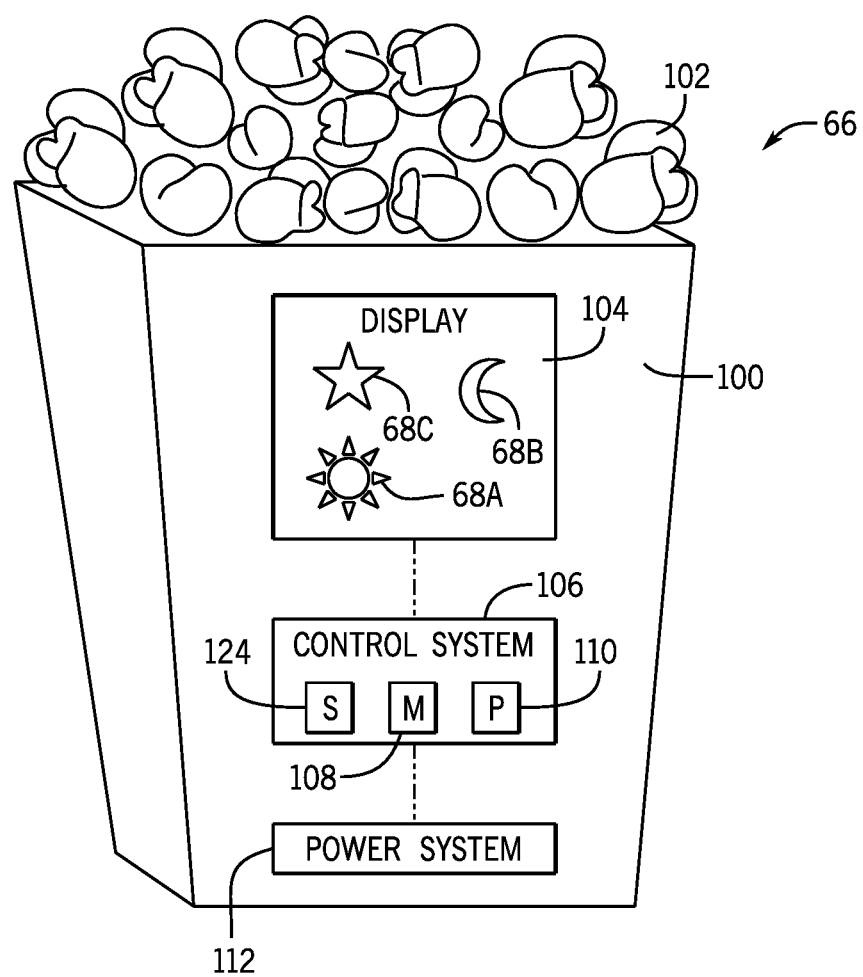
FIG. 4 is a front perspective view of an embodiment of a food and/or drink container configured to adjust imagery being presented, in accordance with an aspect of the present disclosure.

FIG. 4 is a front perspective view of an embodiment of the food and/or drink container 66. The illustrated food and/or drink container 66 may be configured to present multiple imagery 68 via the display 104. For instance, in response to a newly determined parameter (e.g., based on data from the sensor 124), the control system 106 may cause the display 104 to present new imagery 68 in addition to previous imagery 68 presented based on previously determined parameters. As an example, at a first period of time, the control system 106 may determine that the food and/or drink container 66 is at a first location (e.g., the first location 52 of FIG. 1) of the amusement park system and cause the display 104 to present the first imagery 68A based on the food and/or drink container 66 being at the first location. At a second period of time, the control system 106 may determine that the food and/or drink container 66 is at a second location (e.g., the second location 54 of FIG. 1) of the amusement park system and cause the display 104 to present the second imagery 68B based on the food and/or drink container 66 being at the second location. The control system 106 may also maintain presentation of the first imagery 68A such that the display 104 presents both the first imagery 68A and the second imagery 68B. At a third period of time, the control system 106 may determine that the food and/or drink container 66 is at a third location of the amusement park system and cause the display 104 to present third imagery 68C based on the food and/or drink container 66 being at the third location. The control system 106 may further maintain presentation of the first imagery 68A and the second imagery 68B. In this manner, different imagery 68 may accumulate on the display 104 based on the locations through which the food and/or drink container 66 may be carried.

The control system 106 may additionally, or alternatively, operate the display 104 to present multiple imagery 68 based on other parameters. For example, the control system 106 may maintain presentation of imagery 68 based on a previous interaction between the food and/or drink container 66 and an interactive element. That is, in response to a determined first interaction between the food and/or drink container 66 and a first interactive element, the control system 106 may cause the display 104 to present the first imagery 68A. In response to a determined second interaction between the food and/or drink container 66 and a second interactive element after the determined first interaction between the food and/or drink container 66 and the first interactive element, the control system 106 may cause the display 104 to present the second imagery 68B, while maintaining presentation of the first imagery 68A. Indeed, the control system 106 may cause the display 104 to present new imagery 68 in addition to maintaining presentation of previous imagery 68 associated with previously determined parameters. Thus, the imagery 68 presented via the display 104 may indicate historical activity associated with the food and/or drink container 66. Further, the food and/or drink container 66 may be utilized as a display for a collection of mementos (e.g., reminders of visits or achievements).

Figure 5:
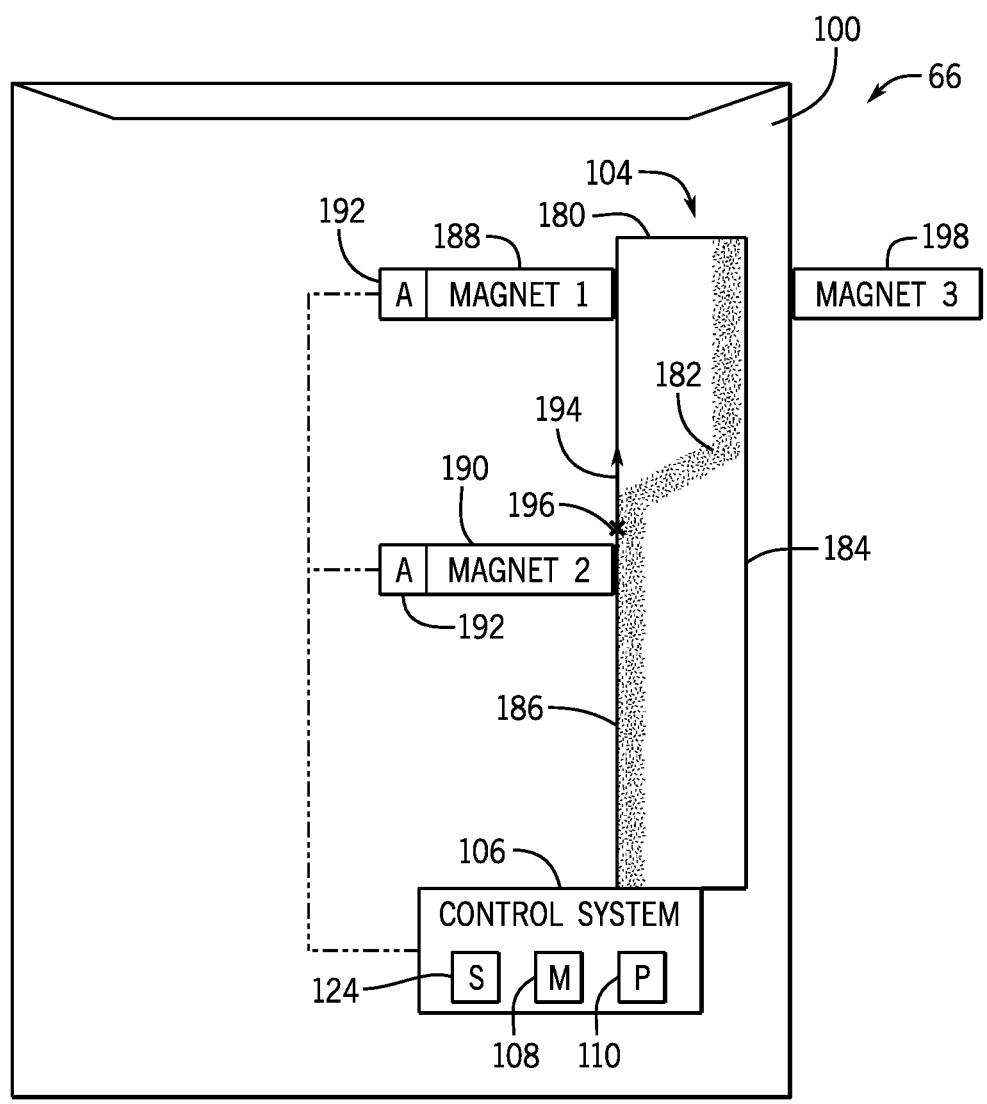
FIG. 5 is a schematic diagram of an embodiment of a food and/or drink container configured to adjust imagery being presented, in accordance with an aspect of the present disclosure.

FIG. 5 is a schematic diagram of an embodiment of the food and/or drink container 66 configured to adjust imagery being presented. The illustrated food and/or drink container 66 may utilize magnetic features to adjust presented imagery. For example, the display 104 of the food and/or drink container 66 may include a vessel or chamber 180 configured to enclose particles 182, such as metal powder, that are magnetically charged. The particles 182 may be configured to move within the food and/or drink container 66, such as between a first side 184 (e.g., an exterior side, an outer surface, a transparent surface) and a second side 186 (e.g., an interior side, an inner surface), opposite the first side 184, of the vessel 180. In an embodiment, the particles 182 may be submerged within a light-colored fluid (e.g., a white fluid), and magnetic forces may cause movement of the particles 182 relative to the sides 184, 186. The first side 184 of the vessel 180 may be at least partially transparent to enable the guest to visualize the particles 182 that are adjacent to the first side 184. Thus, in sections where the particles 182 are positioned at the first side 184, the particles 182 may absorb light emitted through the first side 184 to cause the guest to see a dark appearance. In sections where the particles 182 are positioned more adjacent to the second side 186, the light-colored fluid may be positioned adjacent to the first side 184 and may reflect light to cause the guest to see a colorless (e.g., white) appearance. Thus, the positioning of the particles 182 within the vessel 180 may provide the imagery visible to the guest through the first side 184. Additionally, the liquid within the vessel 180 may facilitate distribution of the particles 182 within the vessel 180, such as to block movement of the particles 182 via a gravitational force. For this reason, desirable positioning of the particles 182 (e.g., adjacent to the first side 184, adjacent to the second side 186) may be maintained in order to maintain the imagery being presented via the display 104.

In an embodiment, the food and/or drink container 66 may include a first magnet 188 and a second magnet 190 (e.g., magnets internal to the enclosure 100, magnets external to the vessel 180, magnets that are integral to the food and/or drink container 66) positioned adjacent to the second side 186 of the vessel 180. The first magnet 188 may be of the same charge as the particles 182 and may therefore be configured to repel the particles 182, thereby driving movement of the particles 182 away from the second side 186 and toward the first side 184. The second magnet 190 may be of an opposite charge as the particles 182 and may therefore be configured to attract the particles 182, thereby driving movement of the particles 182 toward the second side 186 and away from the first side 184. The positioning and movement of the first and second magnets 188, 190 may cause the particles 182 to move at different sections within the vessel 180 and be positioned in a desirable manner to present the imagery via the display 104. For example, each of the first and second magnets 188, 190 may be movable via a respective actuator 192 communicatively coupled to the control system 106, and the control system 106 may be configured to instruct the actuators 192 to move the first and second magnets 188, 190 and position the particles 182 adjacent to the first side 184 at certain sections within the vessel 180 and adjacent to the second side 186 at other sections within the vessel 180 to form the imagery visible by the guest. Indeed, the control system 106 may be configured to coordinate movement of the first and second magnets 188, 190 in any suitable direction along the second side 186, such as in a first direction 194 (e.g., a vertical direction) along the second side 186, a second direction 196 (e.g., a longitudinal direction, a horizontal direction perpendicular to the vertical direction) along the second side 186, or any other suitable direction (e.g., along a plane formed by the first direction 194 and the second direction 196), to move the particles 182 toward and/or away from the first side 184 to form the imagery.

In an additional or alternative embodiment, a third magnet 198 may drive movement of the particles 182 within the vessel 180. For example, the third magnet 198 may be of the opposite charge as the particles 182 and may therefore attract the particles 182 and cause the particles 182 to move toward the first side 184. The third magnet 198 may be separate from the food and/or drink container 66 (e.g., external to the enclosure 100) and may move along the enclosure 100 (e.g., along the first side 184) to cause movement of the particles 182 at different sections within the vessel 180 in order to form the imagery presented by the display 104. In an embodiment, the third magnet 198 may be manually movable by a user. In an additional or alternative embodiment, the third magnet 198 may be automatically moved, such as via a control system. In a further embodiment, another magnet integral to the food and/or drink container 66 (e.g., internal to the enclosure 100) may be configured to move along the enclosure 100 and drive movement of the particles 182 toward the first side 184 to form the imagery presented by the display 104. For example, the control system 106 may be configured to control movement of such a magnet.

Figure 6:
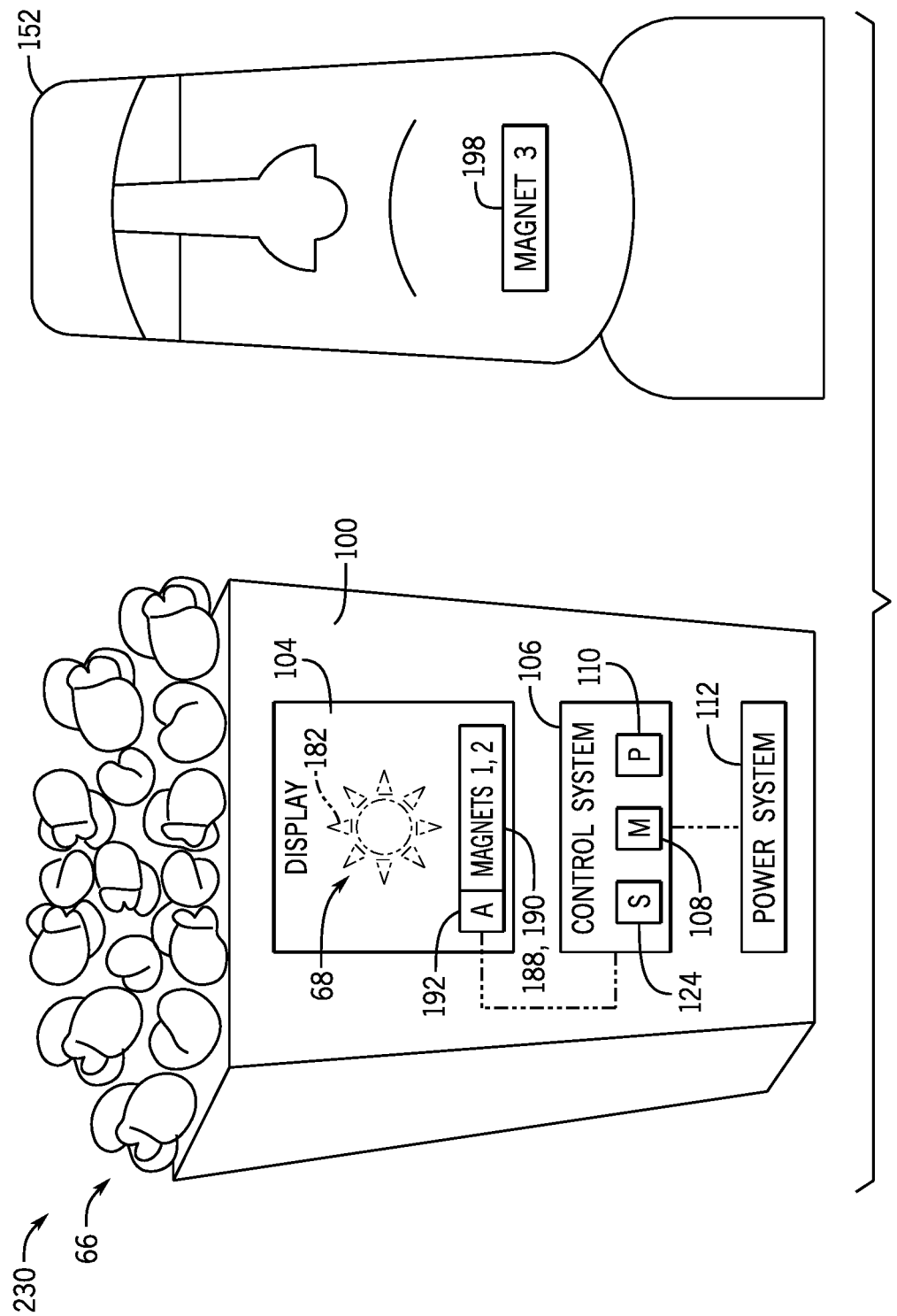
FIG. 6 is a schematic diagram of an embodiment of a system configured to adjust imagery presented via a food and/or drink container, in accordance with an aspect of the present disclosure.

FIG. 6 is a schematic diagram of an embodiment of a system 230 configured to adjust the imagery 68 presented by the food and/or drink container 66. The food and/or drink container 66 may include the first and second magnets 188, 190 and the control system 106 configured to cause movement of the first and second magnets 188, 190 to drive corresponding movement of the particles 182 (e.g., magnetic particles) and enable the display 104 to present the imagery 68. For example, the control system 106 may interface with the power source 112 (e.g., a power source integral to the enclosure 100, a power source separate from the food and/or drink container 66) to cause the first and second magnets 188, 190 to move via the actuators 192. However, the positioning of the particles 182 and therefore the imagery 68 presented by the display 104 may be maintained in absence of the power supplied by the power source 112. Thus, magnetic configurations may activate the display 104 to provide specific imagery 68 that will remain after the interaction (e.g., until another display activation by a separate magnet or interactive element).

Additionally, the system 230 may include the interactive element 152, which may have the third magnet 198 configured to cause the display 104 to present the imagery 68. As an example, the food and/or drink container 66 may be positioned such that the third magnet 198 is in engagement with the display 104 to cause movement of the particles 182 (e.g., toward an exterior side of the display 104) to form the imagery 68. In an embodiment, the third magnet 198 may be positioned, oriented, or otherwise arranged such that the third magnet 198 is preset to form the imagery 68 upon engagement with the display 104. That is, the third magnet 198 may be configured to form the imagery 68 upon engagement with the display 104 (e.g., placement of the display 104 against the third magnet 198) without moving the third magnet 198 along the surface of the display 104. Thus, the third magnet 198 may facilitate formation of the imagery 68, such as without the guest manually drawing or composing the imagery 68 via the third magnet 198.

Figure 7:
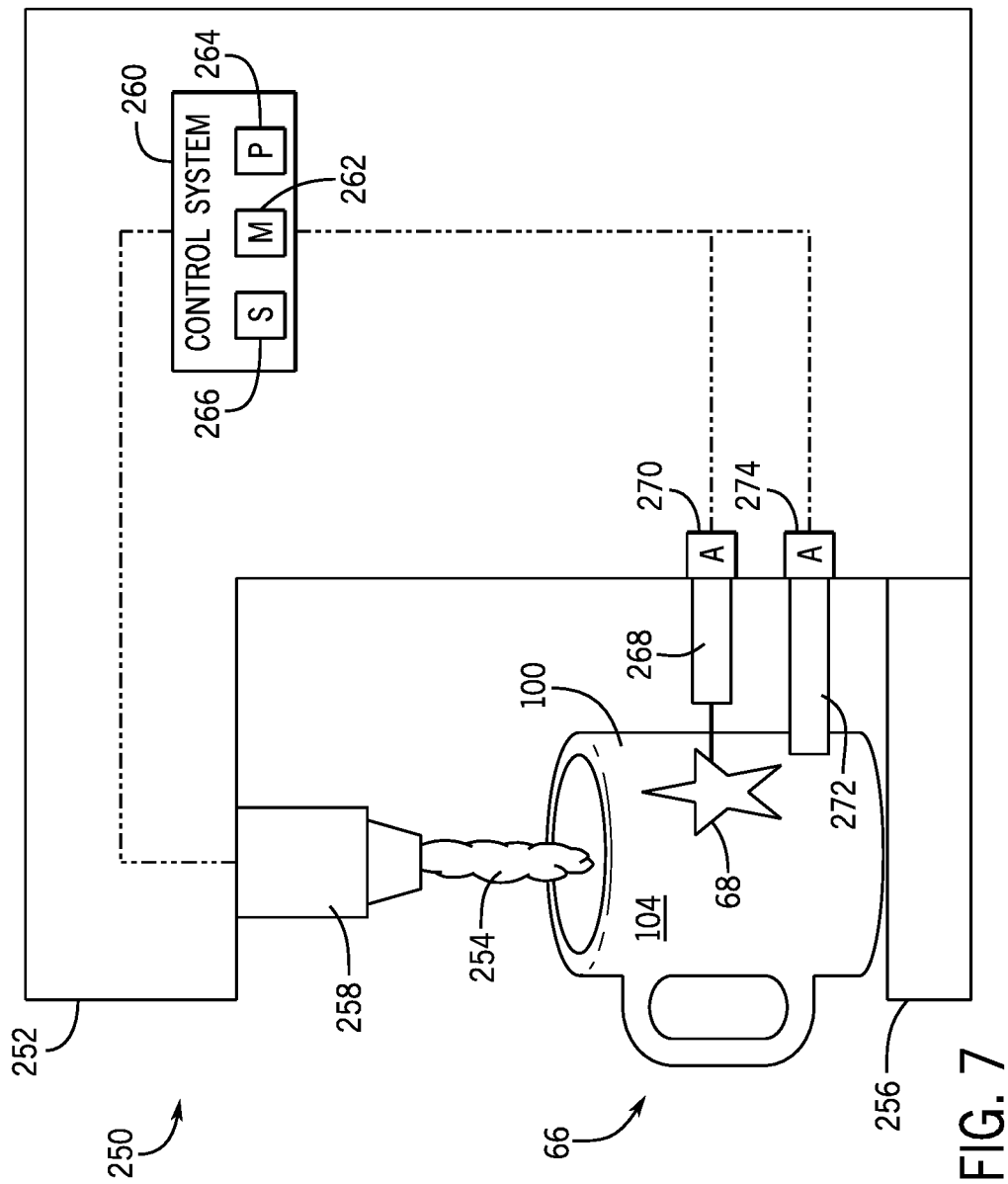
FIG. 7 is a schematic diagram of an embodiment of a system configured to adjust imagery presented via a food and/or drink container, in accordance with an aspect of the present disclosure.

FIG. 7 is a schematic diagram of an embodiment of a system 250 configured to adjust the imagery 68 presented by the display 104 of the food and/or drink container 66. The system 250 may include a food and/or drink dispensing system 252 (e.g., a drink/soda fountain, a drink sprayer, a snack dispenser, a sauce dispenser) configured to output a product 254 (e.g., a liquid drink, a solid food) into the food and/or drink container 66. For example, the food and/or drink dispensing system 252 may include a base or holder 256 on which the food and/or drink container 66 may be positioned, and the food and/or drink dispensing system 252 may include a nozzle 258 configured to output the product 254 into the enclosure 100 of the food and/or drink container 66 positioned on the base 256.

The food and/or drink dispensing system 252 may include a control system 260 with a memory 262 and processing circuitry 264 to control operation of the food and/or drink dispensing system 252. By way of example, the control system 260 may be configured to control operation of the nozzle 258 to output the product 254. For instance, the control system 260 may include or be communicatively coupled to a sensor 266, which may be configured to determine the positioning of the food and/or drink container 66 on the base 256, and the control system 260 may cause the nozzle 258 to output the product 254 into the enclosure 100 in response to determining that the food and/or drink container 66 is positioned on the base 256 (e.g., underneath the nozzle 258). The control system 260 may be configured to operate the nozzle 258 to output the product 254 until the product 254 is at a threshold level within the enclosure 100. Moreover, the food and/or drink dispensing system 252 may include an imagery forming device 268 configured to form the imagery 68 on the food and/or drink container 66. As an example, the imagery forming device 268 may include an etching device configured to physically form the imagery 68 onto the display 104 (e.g., a display surface of the enclosure 100), such as via a blade, a laser etching technique, a chemical etching process, a high velocity fluid, and so forth. As another example, the imagery forming device 268 may include a magnet (e.g., the third magnet 198 of FIGS. 5 and 6) configured to drive movement of magnetic particles within the display 104 to form the imagery. As a further example, the control system 260 may communicate with a corresponding control system (e.g., the control system 106 of FIGS. 2-6) of the food and/or drink container 66 to cause the control system of the food and/or drink container 66 to form the imagery on the display 104. In any case, upon determining engagement between the food and/or drink container 66 and the food and/or drink dispensing system 252 (e.g., contact between the food and/or drink container 66 and the base 256), the control system 260 may operate the imagery forming device 268 to form the imagery 68 on the food and/or drink container 66. For instance, the control system 260 may be configured to instruct an actuator 270 to move the imagery forming device 268 relative to the food and/or drink container 66 to form the imagery 68 on the display 104.

The control system 260 may further include an imagery removing device 272, which may be configured to remove the imagery 68 on the display 104, such as to enable formation of a subsequent imagery on the display 104. By way of example, the imagery removing device 272 may be configured to remove the imagery 68 using a chemical process, a blade (e.g., to obfuscate, scrape, and/or scratch off the imagery 68), a magnet, and so forth. The control system 260 may be configured to control operation of the imagery removing device 272, such as by instructing an actuator 274 to move the imagery removing device 272 relative to the food and/or drink container 66 to remove the imagery 68. For instance, in response to determining that the food and/or drink container 66 is positioned on the base 256, the control system 260 may determine whether imagery is currently being presented via the display 104. In response to a determination that imagery is currently being presented, the control system 260 may instruct the actuator 274 to move the imagery removing device 272 to remove such imagery. During or after removal of the imagery via the imagery removing device 272, the control system 260 may instruct the actuator 270 to move the imagery forming device 268 to form new imagery on the food and/or drink container 66. In this manner, operation of the imagery forming device 268 and the imagery removing device 272 may be coordinated to update imagery formed on the food and/or drink container 66.

In an embodiment, the control system 260 may be configured to operate the food and/or drink dispensing system 252 to re-fill the food and/or drink container 66 at a certain frequency. For example, the control system 260 may determine whether a threshold duration of time has elapsed since the food and/or drink container 66 was previously filled to determine whether the food and/or drink container 66 is to be re-filled. The imagery 68 formed in a previous interaction or a default form of the imagery 68 may facilitate monitoring an elapsed duration of time by including a time stamp, which may be directly indicated (e.g., printed out), camouflaged, encoded, or otherwise incorporated into the imagery 68. For instance, during a first engagement between the food and/or drink container 66 and the food and/or drink dispensing system 252 (e.g., indicative of operation of the food and/or drink dispensing system 252 to fill the food and/or drink container 66), the control system 260 may identify a first time stamp (e.g., via the sensor 266) associated with the first engagement between the food and/or drink container 66 and the food and/or drink dispensing system 252, and form the imagery 68 on the display 104 (e.g., via the imagery forming device 268) to indicate the first time stamp. During a second engagement between the food and/or drink container 66 and the food and/or drink dispensing system 252 (e.g., indicative of operation of the food and/or drink dispensing system 252 to re-fill the food and/or drink container 66), the control system 260 may identify the imagery 68 indicative of the first time stamp and determine a second time stamp (e.g., via the sensor 266) associated with the second engagement between the food and/or drink container 66 and the food and/or drink dispensing system 252.

The control system 260 may determine a duration of time that has elapsed since the first engagement between the food and/or drink container 66 and the food and/or drink dispensing system 252 based on a difference between the first time stamp indicated by the imagery 68 and the second time stamp determined via the sensor 266. In response to determining that the threshold duration of time has elapsed (e.g., based on the determined duration of time being greater than the threshold duration of time), the control system 260 may cause the nozzle 258 to output the product 254 into the enclosure 100. The control system 260 may also operate the imagery forming device 268 and/or the imagery removing device 272 to update the indicated time stamp (e.g., to remove the imagery 68 indicating the first time stamp, to form additional imagery indicating the second time stamp). Thus, during a subsequent engagement between the food and/or drink container 66 and the food and/or drink dispensing system 252, the control system 260 may determine whether the threshold duration of time since the second time stamp has elapsed to determine whether the product 254 is to be output into the food and/or drink container 66.

Moreover, in response to determining that the threshold duration of time has not elapsed (e.g., based on the difference between the first time stamp indicated by the imagery 68 and the second time stamp determined via the sensor 266 being below the threshold duration of time), the control system 260 may block the nozzle 258 from outputting the product 254 into the enclosure 100. Additionally, the control system 260 may block operation of the imagery forming device 268 and/or the imagery removing device 272 in order to maintain the imagery 68 presented by the food and/or drink container 66. As such, the imagery 68 may continue to be referred to during subsequent engagements between the food and/or drink container 66 and the food and/or drink dispensing system 252 to determine whether the threshold duration of time has elapsed since the first engagement between the food and/or drink container 66 and the food and/or drink dispensing system 252, until the food and/or drink container 66 is re-filled via the food and/or drink dispensing system 252 and the imagery 68 is correspondingly updated.

Figure 8:
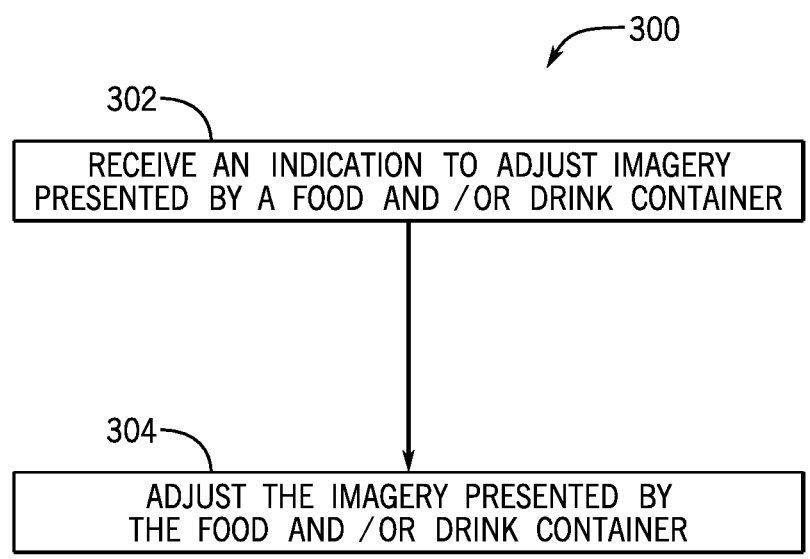
FIG. 8 is a flowchart of a method or process for adjusting imagery presented via a food and/or drink container, in accordance with an aspect of the present disclosure.

FIG. 8 is a flowchart of a method or process 300 for adjusting imagery presented by a food and/or drink container (e.g., the food and/or drink container 66 of FIGS. 1-7). Any suitable device (e.g., the processing circuitry 110 of the control system 106 of FIGS. 2-6, the processing circuitry 264 of the control system 260 of FIG. 7) may perform the method 300. In one embodiment, the method 300 may be implemented by executing instructions stored in a tangible, non-transitory, computer-readable medium (e.g., the memory 108 of the control system 106 of FIGS. 2-6, the memory 262 of the control system 260 of FIG. 7). For example, the method 300 may be performed at least in part by one or more software components, one or more hardware components, one or more software applications, and the like. While the method 300 is described using steps in a specific sequence, additional steps may be performed, the described steps may be performed in different sequences than the sequence illustrated, and/or certain described steps may be skipped or not performed altogether.

At block 302, an indication to adjust imagery presented by a food and/or drink container may be received. In an embodiment, the indication may be received based on a determined parameter, such as a determined location of the food and/or drink container. In an additional or alternative embodiment, the indication may be received based on a determined interaction between the food and/or drink container and an interactive element, such as via a determined identifier of the interactive element. In a further embodiment, the indication may be received in response to a determination that the food and/or drink container is to be re-filled, such as based on an engagement between the food and/or drink container and a food and/or drink dispensing system, a determination that a threshold duration of time since the food and/or drink container 66 was previously filled has elapsed, or both.

At block 304, the imagery presented by the food and/or drink container may be adjusted. As an example, charges of electrodes may be adjusted to drive movement of electrically charged particles of a display of the food and/or drink container, a magnet may be moved to drive movement of magnetically charged particles of the display, and/or any other suitable imagery forming device may be used to cause the food and/or drink container to adjust the presented imagery. In an embodiment, new imagery may be presented in addition to imagery previously presented by the food and/or drink container. As such, presented imagery may accumulate over time. In an additional or alternative embodiment, previous imagery presented by the food and/or drink container may be removed and/or obfuscated. Thus, newly presented imagery may replace previously presented imagery.

Figure 9:
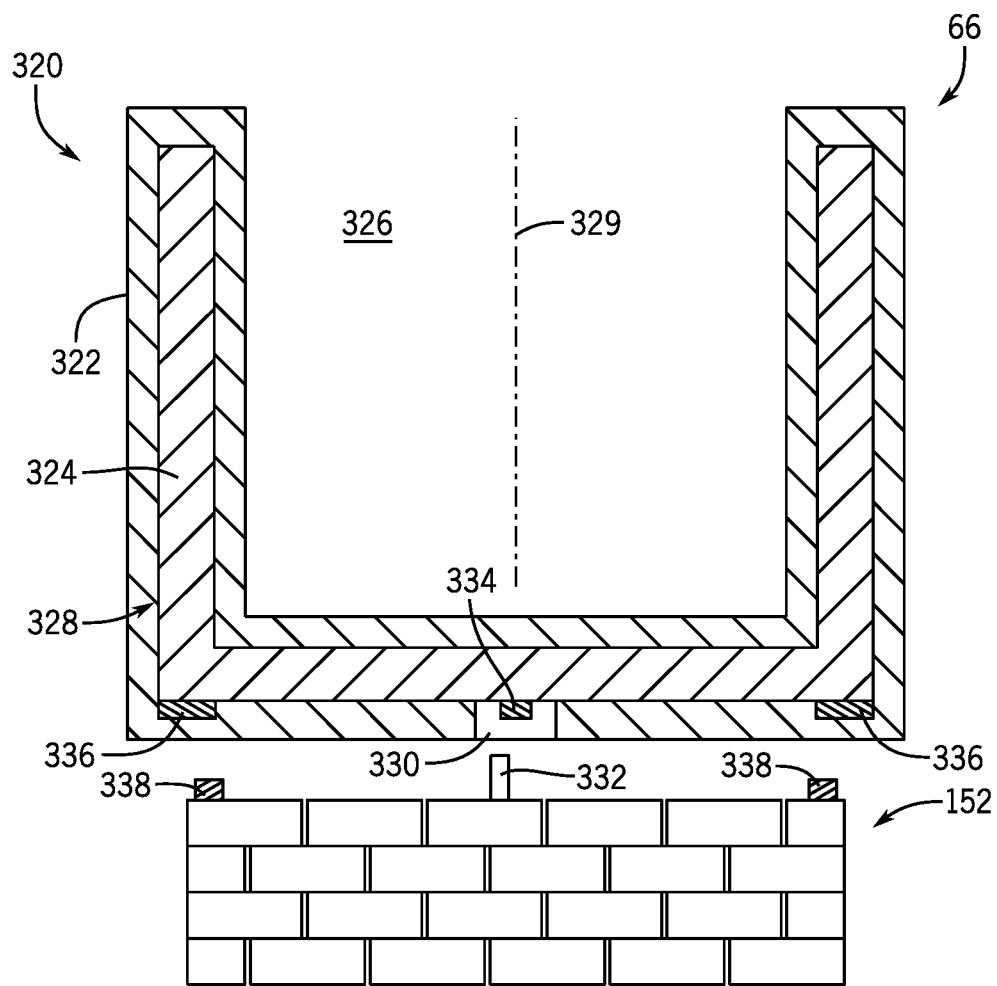
FIG. 9 is a front perspective view of an embodiment of a food and/or drink container configured to adjust imagery being presented, in accordance with an aspect of the present disclosure.

FIG. 9 is a cross sectional view of an embodiment of the food and/or drink container 66. The food and/or drink container 66 may include an enclosure 320 having nested components. For example, the enclosure 320 may include an outer cover 322 and a base 324 nested within the outer cover 322. The outer cover 322 may define a space 326 in which a food and/or drink may be received, and the outer cover 322 may include an interior volume 328 in which the base 324 may be positioned. The outer cover 322 and the base 324 may be configured to rotate relative to one another about a rotational axis 329, which may extend through the center of the enclosure 320. To this end, each of the outer cover 322 and the base 324 may have a curved profile, such as a cylindrical or spherical geometry, to facilitate relative rotation between the outer cover 322 and the base 324. Moreover, certain spaces between the outer cover 322 and the base 324 may be covered or sealed to block various particles (e.g., dust, debris, food, drink) from entering between the outer cover 322 and the base 324, while enabling the relative rotation between the outer cover 322 and the base 324. Different rotational positions of the outer cover 322 and the base 324 may result in depiction of different imagery. For example, portions of the base 324 may be exposed to outside view via slots and/or windows of the outer cover 322 while other portions of the base 324 are hidden. In this way, different imagery is presented to a viewer of the food and/or drink container 66 depending on which portions of the base 324 are visible through and hidden by the outer cover 322. In an embodiment, the outer cover 322 may include lenticular features (e.g., integral lenticular features or a coupled layer of lenticular material) that facilitate this process (e.g., by magnifying aspects of imagery on a surface of the base 324 that is adjacent the outer cover 322).

In one embodiment, relative rotation between the outer cover 322 and the base 324 may be enabled via the interactive element 152. For example, the enclosure 320 may include an opening 330 (e.g., a slot, an aperture). The interactive element 152 may include an activator 332 (e.g., an insert, an extension) configured to insert into the opening 330. The activator 332 may engage with the base 324 while inserted within the opening 330. For instance, the base 324 may include a receptacle 334 (e.g., a keyed slot) with which the activator 332 may engage via the opening 330. Relative rotation between the outer cover 322 and the activator 332 (e.g., via a physically applied force) while the activator 332 is engaged with the base 324 may drive relative rotation between the outer cover 322 and the base 324. For instance, the base 324 may remain rotationally fixed with respect to the activator 332 while engaged with the activator 332. Therefore, relative rotation between the outer cover 322 and the activator 332 may also cause relative rotation between the outer cover 322 and the base 324. Indeed, the activator 332 may actuate a linkage system (e.g., a gear) to cause mechanical rotation of the base 324 relative to the outer cover 322.

The base 324 may additionally, or alternatively, include first magnets 336, and the interactive element 152 may include second magnets 338. The second magnets 338 may apply a magnetic force that may drive movement of the first magnets 336 and therefore of the base 324 relative to the outer cover 322. For instance, the first magnets 336 may be disposed at various positions (e.g., along a circumference or perimeter) of the food and/or drink container 66, and the second magnets 338 may be disposed at various corresponding positions (e.g., along a circumference or perimeter) of the interactive element 152. Positioning of the food and/or drink container 66 relative to the interactive element 152 (e.g., to position the first magnets 336 within a threshold distance of the second magnets 338) may impart a magnetic force that drives the movement of the first magnets 336. As an example, the second magnets 338 may impart a magnetic force that attracts the first magnets 336 toward alignment (e.g., vertical alignment) with the second magnets 338. Such movement of the first magnets 336 toward alignment with the second magnets 338 may cause the base 324 to rotate about the rotational axis 329. In such an embodiment, the second magnets 338 may also be configured to rotate about the rotational axis 329 to cause rotation of the base 324. For instance, upon positioning the food and/or drink container 66 to align and engage the first magnets 336 with the second magnets 338, the second magnets 338 may be rotated about the rotational axis 329 and relative to the outer cover 322 (e.g., via a physically applied force, via a controller input) to drive corresponding rotation of the first magnets 336 about the rotational axis 329 and relative to the outer cover 322. As another example, the second magnets 338 may impart a magnetic force that repels the first magnets 336 away from the second magnets 338 and to offset (e.g., vertically offset) from the second magnets 338. The movement of the first magnets 336 away from the second magnets 338 may cause the base 324 to rotate about the rotational axis 329.

The base 324 may also rotate relative to the outer cover 322 using other techniques. As an example, a portion of the base 324 may be exposed to a surrounding environment, and a guest may apply a manual force onto the portion of the base 324 to cause the base 324 to rotate relative to the outer cover 322. Thus, the outer cover 322 may be configured to rotate relative to the base 324 without engagement with the interactive element 152. However, it may be desirable to limit access to rotation by requiring a keyed engagement or the like. This may add interest by requiring interaction with special devices (e.g., devices in special locations) to achieve a desired rotation position and associated imagery. In the embodiment of the food and/or drink container 66 illustrated in FIG. 9, undesirable relative rotation between the outer cover 322 and the base 324 may be blocked without appropriate engagement. For instance, absent an engagement between the interactive element 152 and the food and/or drink container 66 and/or absent another force imparted onto the food and/or drink container 66, the relative positioning between the outer cover 322 and the base 324 may be maintained (e.g., via a detent, via a spring, via a pin).

Figure 10:
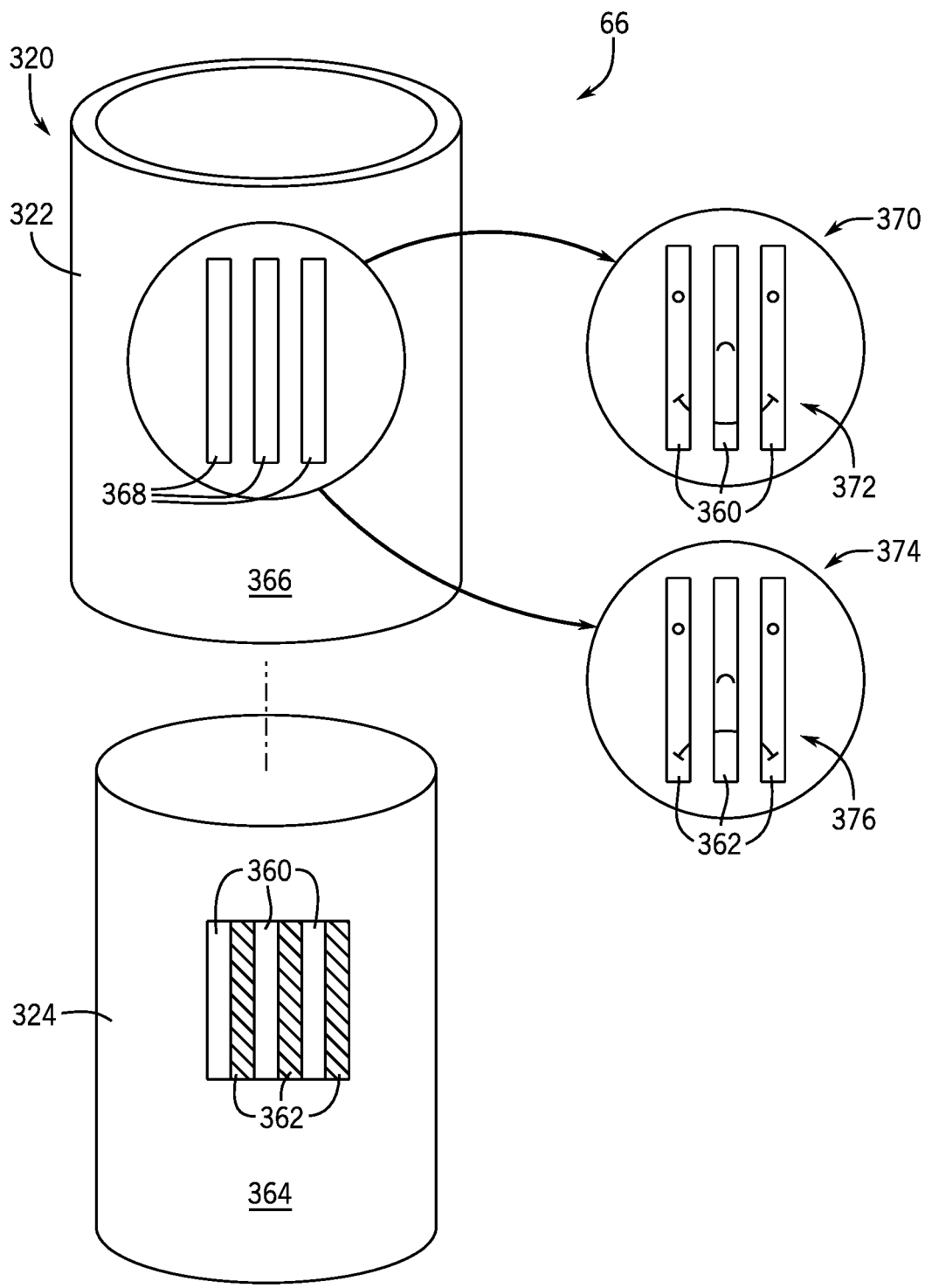
FIG. 10 is an exploded view of an embodiment of a food and/or drink container configured to adjust imagery being presented, in accordance with an aspect of the present disclosure.

FIG. 10 is an exploded view of an embodiment of the food and/or drink container 66 in which the outer cover 322 is separated from the base 324. The base 324 may include various image segments, such as a first set of image segments 360 and a second set of image segments 362 formed on an outer surface 364 of the base 324. The set of image segments 360, 362 may be interleaved along the outer surface 364 of the base 324. For example, respective image segments of the set of image segments 360, 362 may be offset from one another and may be positioned in an alternating arrangement along the outer surface 364. The outer cover 322 may include an outer surface 366 that may be opaque and may therefore block visibility of the set of image segments 360, 362 while the set of image segments 360, 362 are aligned with the outer surface 366. Additionally, the outer cover 322 may include windowed slots or openings 368 formed through the outer surface 366, and the windowed slots 368 may enable visualization of the set of image segments 360, 362 while the set of image segments 360, 362 is aligned with the windowed slots 368. For example, relative rotation between the outer cover 322 and the base 324 may align one of the set of image segments 360, 362 with the windowed slots 368 to enable visibility of the associated image segments, while the other of the set of image segments 360, 362 may align with the outer surface 366 and may therefore be covered and not visible. As such, the outer surface 366 may provide a display in which the set of image segments 360, 362 may be presented via the windowed slots 368. The windowed slots 368 may include lenses that magnify aspects of the image segments 360, 362 to more efficiently or effectively provide a desired display. Although the illustrated base 324 includes two sets of image segments 360, 362, each having three image segments configured to align with three windowed slots 368 of the outer cover 322, in an additional or alternative embodiment, the base 324 may include any suitable quantity of sets of image segments 360, 362 that include any suitable quantity of image segments configured to align with a corresponding quantity of windowed slots 368 of the outer cover 322.

By way of example, in a first configuration 370 of the food and/or drink container 66 (e.g., a first relative positioning between the outer cover 322 and the base 324), the first set of image segments 360 may be aligned with the windowed slots 368 and may therefore be visible. For instance, the visible first set of image segments 360 may form a first coherent image 372 or an image collectively formed by visible, individual image segments, such as a happy face. In a second configuration 374 of the food and/or drink container 66 (e.g., a second relative positioning between the outer cover 322 and the base 324), the second set of image segments 362 may be aligned with the windowed slots 368 and may be visible to form a second coherent image 376, such as a sad face. In the first configuration 370, the second set of image segments 362 may not be visible, and in the second configuration 374, the first set of image segments 360 may not be visible. Thus, the food and/or drink container 66 may be adjusted to selectively present one of the images 372, 376 via the windowed slots 368.

The food and/or drink container 66 may readily transition between the first configuration 370 and the second configuration 374 via relative rotation between the outer cover 322 and the base 324. For example, using the techniques described above, such as engagement between an interactive element and the food and/or drink container 66, the food and/or drink container 66 may be adjusted to display the different images 372, 376. In an embodiment, an interactive element may cause a limited or certain amount of relative rotation between the outer cover 322 and the base 324 to establish a particular positioning between the outer cover 322 and the base 324. For instance, the insert of the interactive element may be keyed or shaped to enable a certain amount of rotation of the base 324 relative to the outer cover 322. As such, the interactive element may enable a certain alignment between the sets of image segments 360, 362 and the windowed slots 368 to cause the food and/or drink container 66 to present a particular image 372, 376. For example, the image 372, 376 enabled for display via the interactive element may correspond to a location of the interactive element. Other interactive elements (e.g., positioned at different locations) may enable different alignments between the sets of image segments 360, 362 and the windowed slots 368 to cause the food and/or drink container 66 to present a different image. Thus, the guest may be encouraged to navigate the amusement park system and engage the food and/or drink container 66 with different interactive elements to present different images.

Moreover, in an embodiment, the images 372, 376 presented via the respective sets of image segments 360, 362 may appear to change based on a perspective of a guest relative to the food and/or drink container 66. As an example, each set of image segments 360, 362 may employ an array of lenses (e.g., lenticular lens). A different set of the array of lenses may be visible to the guest based on an angle between a line of sight of the guest and the visible image segments 360, 362. Each set of the array of lenses may present different imagery. Therefore, adjusting the line of sight of the guest relative to the food and/or drink container 66 (e.g., by moving the food and/or drink container 66 relative to the guest) may change the set of the array of lenses viewed by the guest and therefore change the presented imagery (e.g., collectively forming a coherent image) perceived by the guest. In this manner, a single one of the sets of image segments 360, 362 may present multiple different images to the guest based on a perspective of the guest to view the food and/or drink container 66.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A food and/or drink container, comprising:
an enclosure forming a space configured to receive a food and/or drink;
a display coupled to the enclosure; and
a processor communicatively coupled to the display, wherein the processor is configured to perform operations comprising:
receiving an indication of a current location of the food and/or drink container within an amusement park; and
causing the display to output imagery based on a theme of the current location.

2. The food and/or drink container of claim 1, wherein the processor is configured to perform operations comprising:
referencing data associating respective imagery to corresponding locations within the amusement park, wherein the data comprises a respective theme for each corresponding location;
selecting the imagery associated with the current location based on the data; and
adjusting the imagery output by the display in response to selecting the imagery.

3. The food and/or drink container of claim 1, wherein the current location comprises a first location, and the processor is configured to perform operations comprising:
receiving an indication of movement of the food and/or drink container from the first location to a second location;
causing the display to output additional imagery based on a second theme of the second location in response to the indication of movement to the second location; and
causing the display to maintain the imagery output based on the theme of the first location while causing the display to output.

4. The food and/or drink container of claim 1, comprising a sensor configured to determine a parameter associated with the current location, wherein the sensor is configured to transmit data indicative of the parameter to the processor, and the processor is configured to cause the display to output the imagery based on the data received from the sensor.

5. The food and/or drink container of claim 4, wherein the parameter comprises a signal received by the sensor, and the processor is configured to perform operations comprising:
determining a property of the signal; and
causing the display to output the imagery based on the property.

6. The food and/or drink container of claim 4, wherein the parameter comprises image data captured by the sensor, and the processor is configured to perform operations comprising:
identifying the image data; and
causing the display to output the imagery based on the image data.

7. The food and/or drink container of claim 1, wherein the display is configured to maintain presentation of the imagery in the absence of power being supplied to the display or the processor.

8. A refreshments container, comprising:
an enclosure defining an interior configured to receive refreshments;
a display coupled to the enclosure; and
a control system communicatively coupled to the display, wherein the control system is configured to perform operations comprising:
causing the display to present first imagery based on a first location within an amusement park of the refreshments container, wherein the first imagery corresponds to a first theme of the first location; and
causing the display to present second imagery based on a second location within the amusement park of the refreshments container, wherein the second imagery corresponds to a second theme of the second location, and wherein the display is configured to maintain presentation of the first imagery and the second imagery without utilizing power.

9. The refreshments container of claim 8, wherein the control system is configured to receive power from a power source and utilize the power from the power source to cause the display to present the second imagery.

10. The refreshments container of claim 8, wherein the display comprises magnetic particles configured to move within a vessel to adjust the first imagery or the second imagery presented via visualization of the magnetic particles through the vessel, and positioning of the magnetic particles in the vessel is maintained without utilizing power.

11. The refreshments container of claim 10, comprising a magnet, wherein the control system is configured to drive movement of the magnet based on the second location of the refreshments container to cause movement of the magnetic particles within the vessel.

12. The refreshments container of claim 8, wherein the control system is configured to perform operations comprising:
determining engagement between the refreshments container and a device of the amusement park, the device being separate from the refreshments container;
determining the second location of the refreshments container based on the device; and
determining that the second location and the second imagery are associated based on a theme of the second location and the second imagery.

13. The refreshments container of claim 8, wherein the display comprises a plurality of electrodes positioned at opposite sides of a vessel enclosing charged particles submerged in a fluid, the control system is configured to adjust a set of charges of the plurality of electrodes to move the charged particles within the vessel to present the first imagery.

14. A system, comprising:
a food and/or beverage container, wherein the food and/or beverage container comprises:
an enclosure defining a space for retaining a food or a beverage; and
a display coupled to the enclosure and configured to present imagery; and
a device of an amusement park separate from the food and/or beverage container, wherein the device is configured to engage with the food and/or beverage container, and the display is configured to adjust the imagery being presented in response to an engagement between the device and the food and/or beverage container, and wherein the device comprises a dispensing system configured to output the food or the beverage into the enclosure of the food and/or beverage container.

15. The system of claim 14, wherein the display comprises a plurality of interleaved image segments on a cylindrical base that is nested within a slotted cylindrical cover, the cylindrical base and the cylindrical cover are configured to rotate relative to one another via the device, and a first subset of the plurality of interleaved image segments is exposed by slots of the slotted cylindrical cover to form a coherent image while a second subset of the plurality of interleaved image segments is covered by a surface of the slotted cylindrical cover.

16. The system of claim 15, wherein at least a portion of the device is configured to insert into an opening of the enclosure to engage with the cylindrical base, and the device is configured to drive relative rotation between the cylindrical base and the cylindrical cover via engagement with the cylindrical base.

17. The system of claim 14, wherein the dispensing system comprises a control system configured to perform operations comprising:
determining a first engagement between the food and/or beverage container and the dispensing system;
outputting a product into the enclosure of the food and/or beverage container in response to determining the first engagement between the food and/or beverage container and the dispensing system;
determining a first time stamp associated with the first engagement between the food and/or beverage container and the dispensing system; and
causing the display to adjust the imagery being presented to indicate the first time stamp.

18. The system of claim 17, wherein the control system is configured to perform operations comprising:
determining a second engagement between the food and/or beverage container and the dispensing system;
determining a second time stamp associated with the second engagement between the food and/or beverage container and the dispensing system;
determining a duration of time elapsed since the first engagement between the food and/or beverage container and the dispensing system based on a difference between the first time stamp indicated by the imagery formed on the display and the second time stamp;
determining that the duration of time elapsed is greater than a threshold duration of time;
outputting the product into the enclosure of the food and/or beverage container in response to determining that the duration of time elapsed is greater than the threshold duration of time; and
causing the display to adjust the imagery formed on the display to form updated imagery to indicate the second time stamp.

19. The system of claim 14, wherein the food and/or beverage container comprises a control system configured to perform operations comprising:
determining the engagement between the device and the food and/or beverage container; and
causing the display to adjust the imagery being presented in response to determining the engagement between the device and the food and/or beverage container.

20. The system of claim 14, wherein the food and/or beverage container comprises a control system configured to perform operations comprising:

determining an engagement between the device and the food and/or beverage container;

incrementing a counter indicative of a number of engagements; and causing the display to adjust the imagery to indicate the number of engagements.

\* \* \* \* \*